Patented Jan. 16, 1951

2,538,091

UNITED STATES PATENT OFFICE 2,538,091

SOLUTIONS OF POLYVINYL CHLORIDE AND THE PROCESS FOR PREPARING SAME

Donald Finlayson and Albert William Mortimer Cooke, Spondon, near Derby, England, assignors to Celanese Corporation of America, a corporation of Delaware No Drawing. Application March 16, 1948, Serial No. 15,273. In Great Britain March 28, 1947

7 Claims. (Cl. 260—32.8)

This invention relates to solutions and to materials and articles made therefrom, and especially to solutions of polyvinyl chloride and like polymers and to films, foils, filaments and coatings made therefrom.

A convenient method of forming filaments, films and coatings of organic polymers is to dissolve the polymer in a volatile solvent which is evaporated after forming the solution into the desired shape, for example by extrusion or by flowing it on to a film-casting surface or a surface which is to be coated, for example the surface of a textile fabric. In attempting to use polyvinyl chloride as the organic polymer in this method of forming filaments, films or coatings, difficulty was experienced in finding a suitable volatile solvent. Polyvinyl chloride of the quality suitable for use in such applications is not soluble in any of the common volatile organic liquids available to industry in this country. Thus, liquid petroleum hydrocarbons, benzene, the alcohols, acetone, ether, ethyl acetate and other volatile esters do not dissolve polyvinyl chloride of the grade referred to even when hot. Vinyl chloride can be polymerised to give polymers of low molecular weight which are soluble in acetone. Such polymers however are incapable of producing strong filaments, films or coatings. Methyl ethyl ketone, which is sometimes referred to as a solvent for polyvinyl chloride, does not, in fact, form with it a true solution even at higher temperatures; a gelatinous mass is formed which is not suitable for use in forming films or coatings by the method referred to and from which a suitable solution cannot be formed by dilution. Diethyl ketone and methyl propyl ketone behave similarly.

We have now found that solutions of polyvinyl chloride in mixtures comprising a small proportion of cyclohexanone or a monomethyl cyclohexanone, and a larger proportion, (at least four times the weight of the cyclic ketone) of a more volatile non-associated liquid which is miscible with the cyclic ketone but is not a solvent for the polyvinyl chloride even when hot, and which contains methyl ethyl ketone, can be made, and that filaments, films and coatings can be readily formed by the evaporative method from such solutions. By a non-associated liquid is meant one, the molecules of which are not associated in the liquid state at ordinary temperatures by hydrogen bonding. Thus, for example, polyvinyl chloride can be dissolved in hot cyclohexanone to give solutions containing as much as 25% by weight of the polymer. These solutions, although they set to a gel when cooled to ordinary temperatures, can be diluted with acetone, methyl ethyl ketone or ethyl acetate to a practically unlimited extent without precipitation occurring, and in this way solutions can be formed in which the volatile non-associated liquid constitutes the bulk of the solvent and which are very suitable for the production of films and coatings by the evaporative method. Other volatile non-associated liquids which can be used partly in place of those specified are benzene and methylene chloride. When using these liquids care must be taken on account of their toxicity. The use of methylene chloride as diluent is of particular advantage where quick drying is required.

The following are examples of dilute solutions, of the kind referred to above in which the ratio of cyclohexanone to polyvinyl chloride is 3:1 by weight. All the parts are by weight:

Example 1

100 parts of polyvinyl chloride
300 parts of cyclohexanone
1600 parts of methyl ethyl ketone
Ratio of diluent to cyclohexanone: about 5:1.

Example 2

100 parts of polyvinyl chloride
300 parts of cyclohexanone
2,933 parts of methyl ethyl ketone
Ratio of diluent to cyclohexanone: about 10:1.

In these examples the major part e. g. 70 to 90%, of the methyl ethyl ketone can be replaced by acetone or methylene chloride giving improved volatility. Other non-associated liquids that can be used to replace the major part of the methyl ethyl ketone include benzene and ethyl acetate.

The following are examples of solutions in which the ratio of cyclohexanone to polyvinyl chloride is only 2:1 by weight.

Example 3

100 parts of polyvinyl chloride
80 parts of acetone
180 parts of cyclohexanone
480 parts of methyl ethyl ketone
5,000 parts of methylene chloride
Ratio of diluent to cyclohexanone: about 30:1.

Example 4

100 parts of polyvinyl chloride
180 parts of cyclohexanone
480 parts of methyl ethyl ketone
3,280 parts acetone
Ratio of diluent to cyclohexanone: about 20:1.

Example 5

100 parts of polyvinyl chloride
80 parts of acetone
180 parts of cyclohexanone
3,680 parts of methyl ethyl ketone
Ratio of diluent to cyclohexanone: about 20:1.

Example 6

100 parts of polyvinyl chloride
80 parts of acetone
180 parts of cyclohexanone
480 parts of methyl ethyl ketone
1,300 parts of methylene chloride
Ratio of diluent to cyclohexanone: about 10:1.

Example 7

100 parts of polyvinyl chloride
180 parts of cyclohexanone
480 parts of methyl ethyl ketone
880 parts of acetone
Ratio of diluent to cyclohexanone: about 8:1.

In the solutions of the invention the amount of cyclohexanone may be even less than the weight of the polyvinyl chloride, the remainder of the solvent being composed of the volatile non-associated liquid. Thus, for example, a 20% solution by weight of polyvinyl chloride may be made in a mixture of about 16 parts of cyclohexanone and about 64 parts of methyl ethyl ketone or a mixture of about 16 parts of cyclohexanone, 16 parts acetone and 48 parts methyl ethyl ketone and these solutions which are mobile liquids at temperatures above about 50° C., may be diluted with methyl ethyl ketone or acetone to give solutions of the desired concentration e. g. solutions containing 3 to 5 or 10% of polyvinyl chloride by weight.

The following are examples of solutions in which the ratio of polyvinyl chloride to cyclohexanone is only 0.8:1 by weight.

Example 8

100 parts of polyvinyl chloride
80 parts of cyclohexanone
80 parts of acetone
740 parts of methyl ethyl ketone.
Ratio of diluent to cyclohexanone: about 10:1.

Example 9

100 parts of polyvinyl chloride
80 parts of cyclohexanone
240 parts of methyl ethyl ketone
580 parts of acetone.
Ratio of diluent to cyclohexanone: about 10:1.

Example 10

100 parts of polyvinyle chloride
80 parts of cyclohexanone
80 parts of acetone
1,740 parts of methyl ethyl ketone.
Ratio of diluent to cyclohexanone: about 20:1.

Example 11

100 parts of polyvinyl chloride
80 parts of cyclohexanone
240 parts of methyl ethyl ketone
1,580 parts of acetone
Ratio of diluent to cyclohexanone: about 20:1.

Example 12

100 parts of polyvinyl chloride
80 parts of cyclohexanone
80 parts of acetone
3,073 parts of methyl ethyl ketone
Ratio of diluent to cyclohexanone: about 40:1.

Example 13

100 parts of polyvinyl chloride
80 parts of cyclohexanone
240 parts of methyl ethyl ketone
3,013 parts of acetone.
Ratio of diluent to cyclohexanone: about 40:1.

In all these examples cyclohexanone can be replaced wholly or in part by a mono-methyl cyclohexanone or by a mixture of isomeric mono-methyl cyclohexanones.

In making the solutions of the invention, the polyvinyl chloride should be in finely divided form. A very suitable form is obtained by emulsion polymerisation of vinyl chloride followed by spray-drying. To prevent the powder aggregating into lumps when brought into contact with the cyclohexanone, it may be wetted first with a liquid which is without solvent or swelling effect upon it in the cold, but which is miscible with the other constituents of the solution to be made. Preferably, the polyvinyl chloride is wetted with a little acetone. The suspension so formed is then added to a hot homogeneous mixture of the cyclohexanone and methyl ethyl ketone (e. g. at 45 to 55° C., preferably 50° C.), and dissolved by stirring, and the remainder of the diluent is then added while the solution is at a temperature at which it is still liquid but which is below the boiling point of the diluent to be added, e. g. at 40 to 50° C. according to the boiling point of the diluent used. The rapid evolution of acetone vapour when the wetted polyvinyl chloride is introduced into the hot liquid facilitates solution. The solutions of Examples 3 to 13 are preferably made up in this way. When as in Examples 1 and 2, no acetone is used, the polyvinyl chloride is preferably wetted first with part of the methyl ethyl ketone, e. g. at 55 to 60° C.

Liquids the molecules of which are associated at ordinary temperatures by hydrogen bonding, for example the alcohols, are not suitable diluents in that they cause precipitation of the polyvinyl chloride. Preferably the diluent boils below 85° C.

Plasticisers for polyvinyl chloride, for example dimethyl phthalate, dibutyl phthalate, dioctyl phthalate, dilauryl phthalate, butyl-phthalyl butyl-glycollate, dibutyl sebacate, dioctyl sebacate, dibutyl adipate, tributyl citrate, tetrahydrofuryl oleate, methyl cyclohexanol oxalate, tricresyl phosphate, tributyl phosphate, chlorinated diphenyl, chlorinated paraffin wax, and 2,6-dimethyl thianthrene, may be incorporated in the solutions of the invention.

The solutions of the invention may contain, in addition to the polymer or polymers, heat- or light-stabilisers therefor, for example lead stearate or other salts of lead or other heavy metals, diphenyl thiourea, α-phenyl indole, and adipic acid dihydrazide.

The solutions of the invention may also contain in addition to the polyvinyl chloride other polymers which are soluble in the mixed solvent in which the polyvinyl chloride is dissolved. Such polymers include cellulose esters and ethers, e. g. cellulose acetate, cellulose propionate, cellulose butyrate, cellulose acetate-propionate, cellulose acetate-butyrate, cellulose acetate-stearate, ethyl cellulose and benzyl cellulose; polyvinyl esters, ethers and ketones, e. g. polyvinyl acetate, polyvinyl formal, acetal, and butyral, and polyvinyl methyl ketone; acrylic acid derivatives, e. g. polyethyl acrylate, polymethyl methacrylate and polybutyl methacrylate; and copolymers, e. g. polyvinyl chloride acetate and copolymers of vinyl acetate, vinyl chloride and styrene with maleic anhydride or maleic or fumaric esters. A useful solution containing a cellulose derivative and polyvinyl chloride can be made by mixing a 25% solution of cellulose acetate in acetone with a 20% solution of polyvinyl chloride in a mixture of acetone, cyclohexanone and methyl ethyl ketone, e. g. a solution containing 80 parts of acetone, 80 parts of cyclohexanone and 240 parts of methyl ethyl ketone per 100 parts of polyvinyl chloride. This mixed solution is a useful adhesive adhering readily to metals, glass and wood.

An important use of the solutions of the invention is coating textile materials. Thus for example, fabrics, cords and rope of cellulose or regenerated cellulose may be coated with such solutions containing, for example, 5–10% by weight of polyvinyl chloride, e. g. the solutions of Examples 1 and 6 to 11, with a view to obtaining improved abrasion-resistance. Some improvement in water resistance and wet tenacity can also be obtained by such treatment especially in the case of ropes and cords. Coatings with dilute solutions of the polyvinyl chloride e. g. the solutions of Examples 2 to 5, 12 and 13, may with advantage be applied to stockings and other knitted fabrics of regenerated cellulose with a view to improving the appearance and reducing any tendency of the materials to ladder. Yarns used in the rope making may also be coated from such solutions before doubling. The regenerated cellulose fabrics, cords and ropes referred to above may be made from such high tenacity regenerated cellulose yarns. The solutions of Examples 6 and 7 are very useful for coating textile yarn especially high tenacity (i. e. at least 2 gms. per denier) regenerated cellulose yarn, such as is obtainable by saponifying a cellulose acetate yarn which has been stretched to many times its original length. Thus, for example, yarns of such material, intended as lapping yarns for insulating electrical conducting wires, may be drawn through a bath of such a solution and dried to give the yarn improved abrasion resistance without undesirable reduction in flexibility.

The compositions of the invention can also be used in coating other textile materials, for example materials having a basis of wool (in which case the coating serves to reduce the shrinkage) or of a cellulose ester, for example cellulose acetate, cellulose propionate, cellulose butyrate, cellulose acetate-propionate, cellulose acetate-butyrate, cellulose acetate-laurate, and cellulose acetate-stearate, and cellulose ethers, for example ethyl cellulose and benzyl cellulose. For this purpose the solution used must not, of course, have an undue softening effect on the material treated, and the nature of the diluent used in making the solution will depend on the nature of the material to be coated. Thus, for example, for coating cellulose acetate and derivatives of cellulose with similar solubility properties, a solution identical with that of Example 3 but with the methylene chloride replaced by benzene is suitable. With a view to facilitating adhesion of the polyvinyl chloride to the material, the solution of the invention may contain in addition to the polyvinyl chloride a proportion of a polymer having specific adhesive properties towards the textile material; for example when the textile material contains a substantial proportion of free hydroxyl groups, as in cellulose or regenerated cellulose, such polymers as polyvinyl acetate, polyvinyl chloride-acetate, the polyvinyl acetals, polyethyl acrylate, poly-n-butyl acrylate, polymethyl methacrylate, and other polymers (including copolymers) containing oxygen in side chains or side rings, may be present in the solution. When the textile material contains few hydroxyl groups, as in the cellulose derivatives referred to above, polymers having specific adhesive properties which may be incorporated in the solution with advantage are those which themselves contain a proportion of hydroxyl groups in addition to ester or ether groups, for example copolymers of vinyl acetate, butyl acrylate and acrylic acid.

The solutions of the invention, especially those of Examples 1 to 6 and 10 to 13 are also of use in coating materials such as wood, paper and other non-textile materials having a basis of cellulose (including regenerated cellulose). Similarly, by a suitable choice of diluent, solutions suitable for coating films or moulded or extruded articles of cellulose derivatives may be made.

The solutions of the invention may be applied to metallic surfaces. Thus, an important use of the solutions is in the provision of electrical insulating layers. For example, electrical conducting wires can be given an insulating coating by passage through a bath of a solution such as those of Examples 6 and 7, followed by evaporation of the solvent. In this way very fine wires may be insulated without largely increasing their diameter. Electrostatic condensers can also be built up of layers of metallic foil coated with polyvinyl chloride by the process of the invention. Naturally, for electrical purposes the quality of the polyvinyl chloride and the electrical properties of the other constituents of the solutions are important. Thus, where high specific resistance and low power factor are required in the coating, the polyvinyl chloride should be made by a method such that the polymer does not contain substantial quantities of electrolytes or polar groups. For this purpose it is preferable to use as the polymerisation catalyst hydrogen peroxide or an alkyl peroxide rather than benzoyl peroxide or a persulphate, and care must be taken to avoid introducing into the solution, for example as stabilisers or adhesives, substances containing electrolytes or having high dipole moments.

A further application of the solutions of the invention is in the production of self-supporting films and foils. Thus by depositing on a suitable surface solutions such as those of Examples 3 to 5, evaporating the solvent and stripping the resulting film, strong, tough and flexible films of gauge as low as 0.0003 inches have been produced. Such thin films (commonly termed foils) are very suitable as waterproof wrapping materials and for electrical purposes. Films of heavier gauge can be produced in the same way from more concentrated solutions, e. g. those of Examples 1 and 5 to 11.

Filaments can be spun from the solutions of the invention. For this purpose more concentrated solutions are required, e. g. solutions containing 20 to 25% by weight of polyvinyl chloride.

Having described our invention, what we desire to secure by Letters Patent is:

1. A solution in a volatile solvent of a polyvinyl chloride which is insoluble in methyl ethyl ketone, said solution containing 3 to 10% by weight of the polyvinyl chloride, said solvent consisting of cyclohexanone diluted with a non-associated liquid of boiling point below 85° C. that is not a solvent for polyvinyl chloride, said liquid containing methyl ethyl ketone, the ratio of said liquid to the cyclohexanone ranging from 5:1 to 40:1 and the ratio of methyl ethyl ketone to polyvinyl chloride being at least 2.4:1, said ratios being by weight.

2. A solution in a volatile solvent of a polyvinyl chloride which is insoluble in methyl ethyl ketone, said solution containing 3 to 10% by weight of the polyvinyl chloride, said solvent consisting of cyclohexanone diluted with a non-associated liquid of boiling point below 85° C. that is not a solvent for polyvinyl chloride, said liquid containing methyl ethyl ketone, the ratio of said liquid to the cyclohexanone ranging from 10:1 to 40:1 and the ratio of methyl ethyl ketone to polyvinyl chloride being at least 2.4:1, said ratios being by weight.

3. A solution according to claim 1, wherein at least 70% of the volatile non-associated liquid consists of acetone.

4. A solution according to claim 1, wherein at least 90% of the volatile non-associated liquid consists of methyl ethyl ketone.

5. A solution according to claim 1, wherein at least 70% of the volatile non-associated liquid consists of methylene chloride.

6. Process for making a solution of a polyvinyl chloride which is insoluble in methyl ethyl ketone, which comprises wetting finely-divided polyvinyl chloride with acetone, dissolving the suspension so formed in a hot homogeneous mixture of methyl ethyl ketone with cyclohexanone, and diluting the resulting hot solution with acetone to form a solution in which the ratio of methyl ethyl ketone plus acetone to cyclohexanone ranges from 5:1 to 40:1 by weight and which contains 3 to 10% of its weight of the polyvinyl chloride.

7. Process for making a solution of a polyvinyl chloride which is insoluble in methyl ethyl ketone, which comprises wetting finely-divided polyvinyl chloride with acetone, dissolving the suspension so formed in a hot homogeneous mixture of methyl ethyl ketone with cyclohexanone, and diluting the resulting hot solution with acetone to form a solution in which the ratio of methyl ethyl ketone plus acetone to cyclohexanone ranges from 5:1 to 40:1 and the ratio of methyl ethyl ketone to polyvinyl chloride being at least 2.4:1, said ratios being by weight and which contains 3 to 10% of its weight of the polyvinyl chloride.

DONALD FINLAYSON.
ALBERT WILLIAM MORTIMER COOKE.

REFERENCES CITED

The following references are of record in the file of this patent:

UNITED STATES PATENTS

| Number | Name | Date |
|---|---|---|
| 2,343,997 | Powell et al. | Mar. 14, 1944 |
| 2,408,769 | Fluchaire | Oct. 8, 1946 |
| 2,427,513 | Spessard | Sept. 16, 1947 |